(12) United States Patent
Shirota

(10) Patent No.: US 8,649,088 B2
(45) Date of Patent: Feb. 11, 2014

(54) MICROSCOPE SYSTEM

(75) Inventor: Tetsuya Shirota, Tokyo (JP)

(73) Assignee: Olympus Corporation, Tokyo (JP)

( * ) Notice: Subject to any disclaimer, the term of this patent is extended or adjusted under 35 U.S.C. 154(b) by 334 days.

(21) Appl. No.: 12/940,158

(22) Filed: Nov. 5, 2010

(65) Prior Publication Data

US 2011/0109960 A1    May 12, 2011

(30) Foreign Application Priority Data

Nov. 12, 2009    (JP) ................................. 2009-259311

(51) Int. Cl.
G02B 21/00    (2006.01)

(52) U.S. Cl.
USPC ............................ 359/379; 359/381; 359/392

(58) Field of Classification Search
USPC .................. 359/362, 368, 379–384, 391–398
See application file for complete search history.

(56) References Cited

U.S. PATENT DOCUMENTS

| | | | |
|---|---|---|---|
| 4,653,878 A * | 3/1987 | Nakasato et al. ............. | 359/381 |
| 4,725,720 A | 2/1988 | Sawada et al. | |
| 6,133,561 A | 10/2000 | Toshimitsu et al. | |
| 7,577,484 B2 | 8/2009 | Fiedler et al. | |
| 2004/0190129 A1* | 9/2004 | Peter et al. ..................... | 359/368 |
| 2006/0227414 A1 | 10/2006 | Hashimoto et al. | |

FOREIGN PATENT DOCUMENTS

| | | |
|---|---|---|
| JP | 10-221611 A | 8/1998 |
| JP | 11-084253 A | 3/1999 |
| JP | 3396070 B2 | 4/2003 |
| JP | 2003-307684 A | 10/2003 |
| JP | 3823471 B2 | 9/2006 |
| WO | WO 2005/062104 A1 | 7/2005 |

OTHER PUBLICATIONS

Extended European Search Report (EESR) dated Mar. 1, 2011 (in English) in counterpart European Application No. 10014381.7.
Japanese Office Action dated Jun. 20, 2013 (and English translation thereof) in counterpart Japanese Application No. 2009-259311.

* cited by examiner

*Primary Examiner* — Stephone B Allen
*Assistant Examiner* — James McGee
(74) *Attorney, Agent, or Firm* — Holtz, Holtz, Goodman & Chick, PC

(57) ABSTRACT

A microscope system stores, for each objective, the movement control information including a type flag indicating the type of an objective depending on the presence/absence of a soak or a type of the soak and a save distance for saving the stage or the objective switch unit by a predetermined distance. When a switch direction of objectives is input, and when there is a change in the type of the objective after the switch, the system stops an operation after the stage or the objective switch unit is moved according to the save distance, and recovers the stage or the objective switch unit to an original position after the operation direction input unit inputs an operation direction for the stage and the objective switch unit.

8 Claims, 15 Drawing Sheets

| REVOLVER HOLE POSITION | MAGNIFICATION | FIRST SAVE DISTANCE | TYPE FLAG | SECOND SAVE DISTANCE | RECOVERY SPEED |
|---|---|---|---|---|---|
| 1 | 5x | SA1 | DRY | SB | V1 |
| 2 | 10x | SA2 | DRY | SB | V2 |
| 3 | 40x | SA3 | DRY | SB | V3 |
| 4 | 60x | SA4 | OIL | SB | V4 |
| 5 | 100x | SA5 | OIL | SB | V5 |

FIG. 3

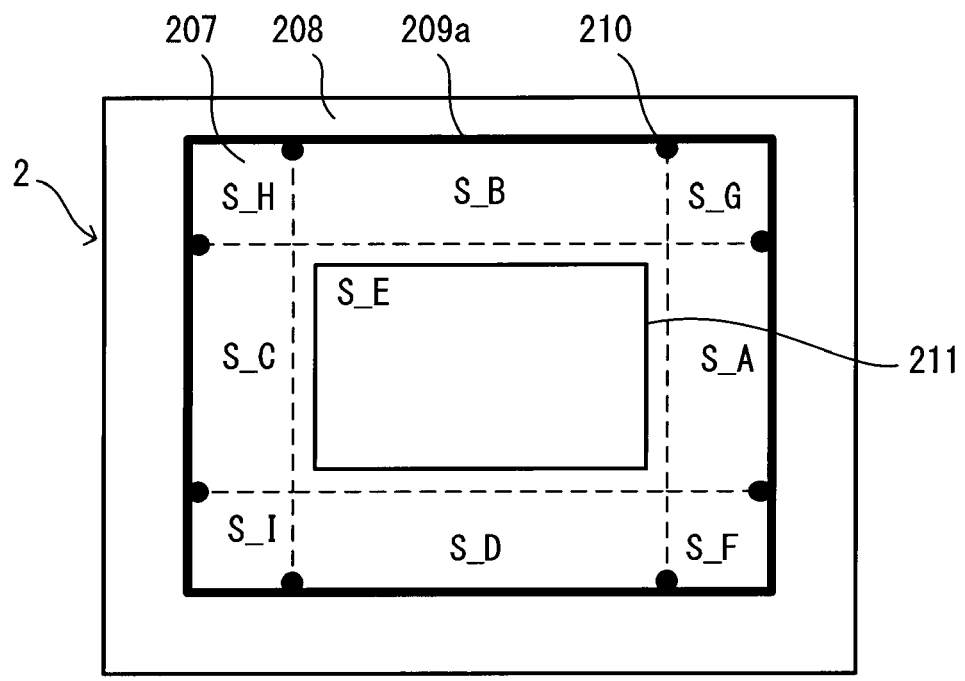
F I G. 4

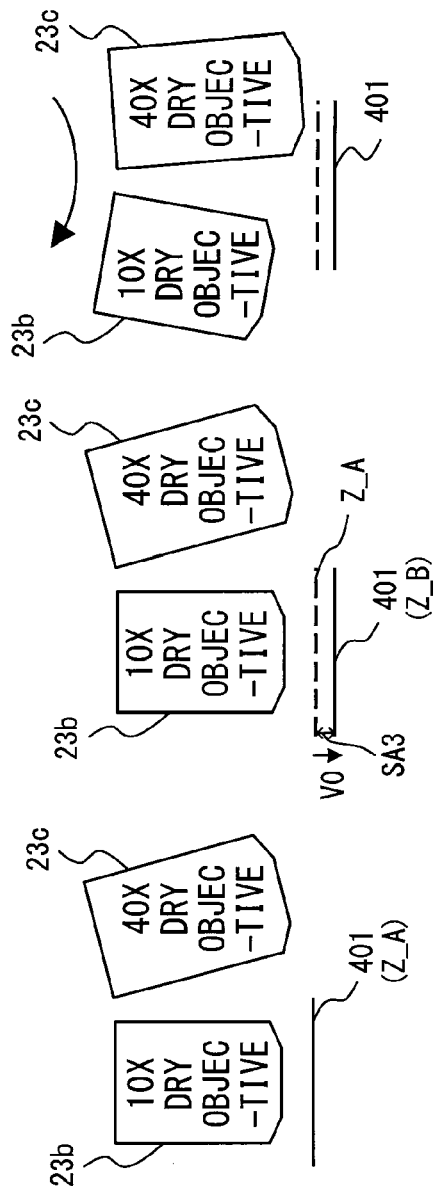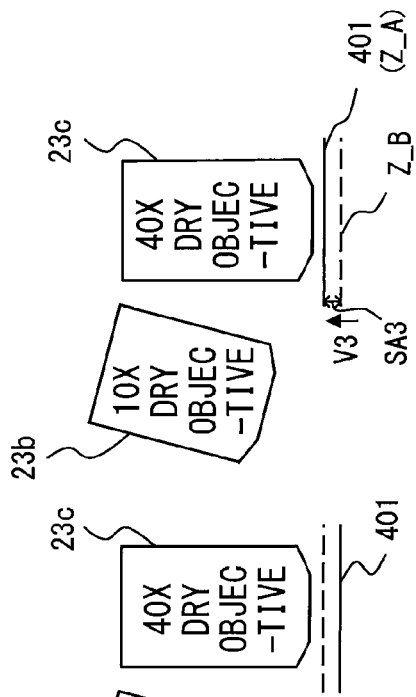

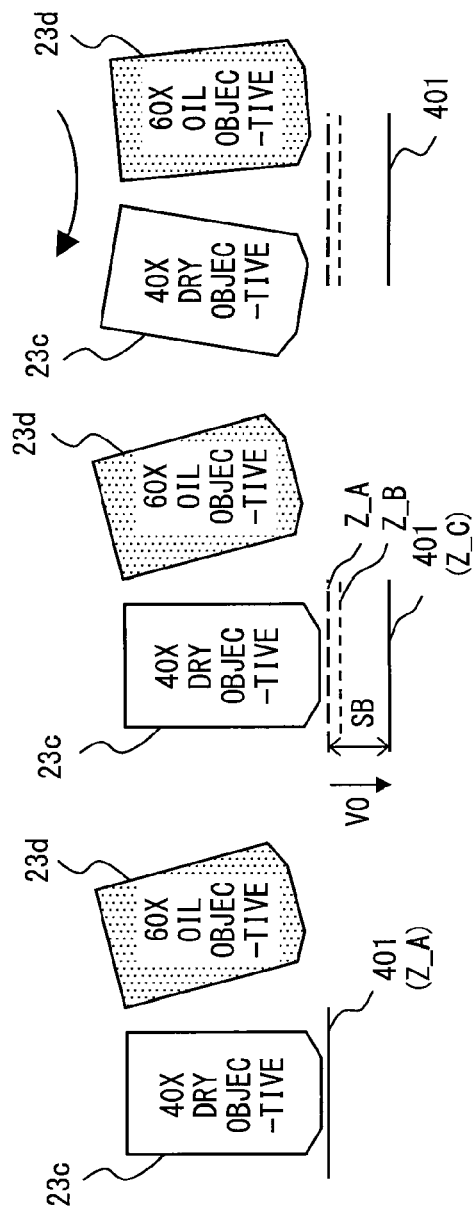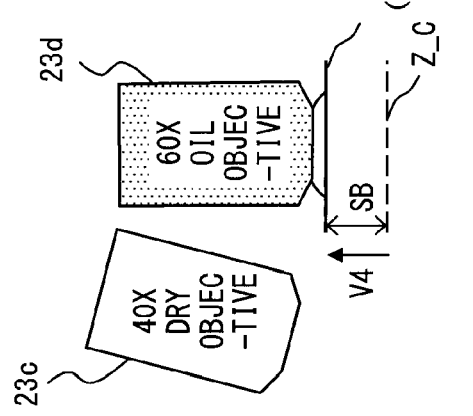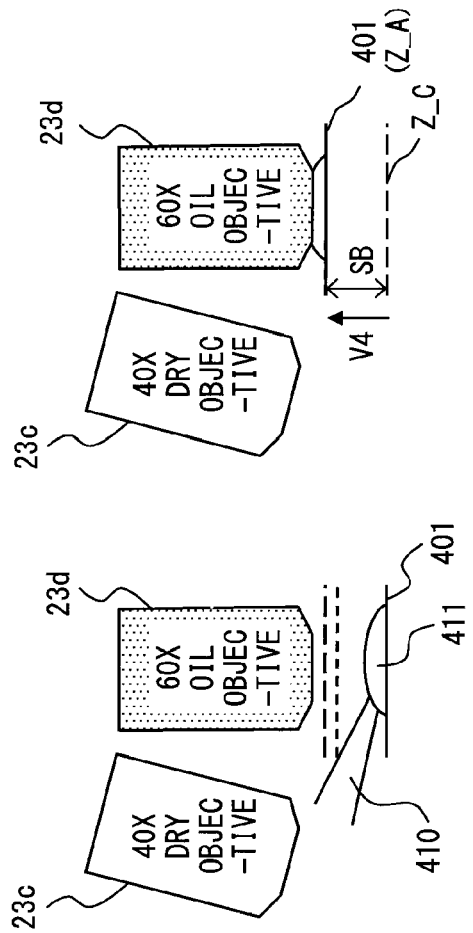

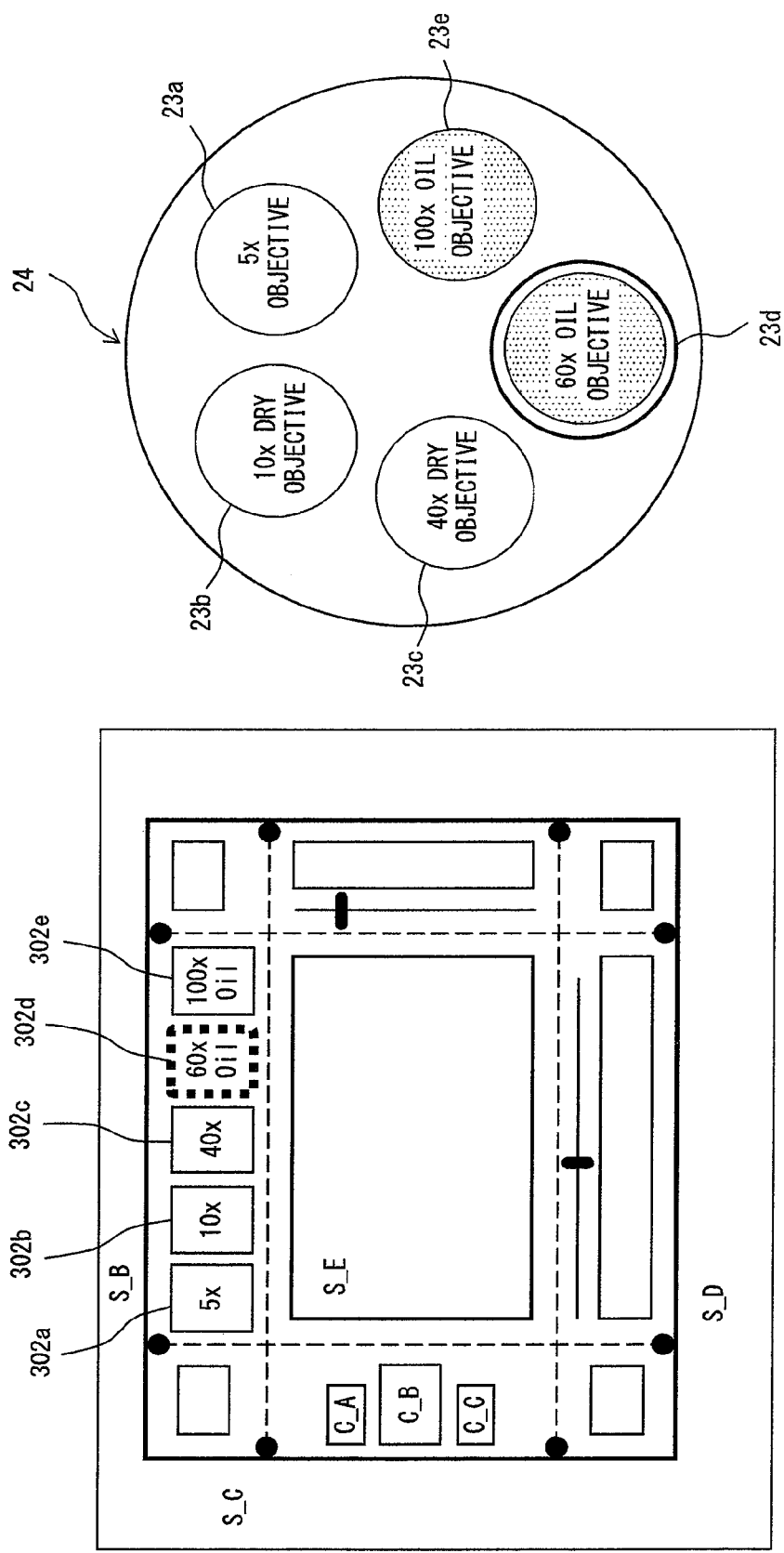

| | CURRENT OBJECTIVE | OBJECTIVE AFTER SWITCH | STAGE RECOVERING OPERATION |
|---|---|---|---|
| PATTERN 1 | DRY OBJECTIVE | DRY OBJECTIVE | RECOVERING OPERATION |
| PATTERN 2 | DRY OBJECTIVE | OIL OBJECTIVE | TEMPORARY STOP |
| PATTERN 3 | OIL OBJECTIVE | DRY OBJECTIVE | TEMPORARY STOP |
| PATTERN 4 | OIL OBJECTIVE | OIL OBJECTIVE | RECOVERING OPERATION |

| REVOLVER HOLE POSITION | MAGNIFICATION | FIRST SAVE DISTANCE | TYPE FLAG | SECOND SAVE DISTANCE | FIRST RECOVERY SPEED | SECOND RECOVERY SPEED | SPEED CHANGE DISTANCE |
|---|---|---|---|---|---|---|---|
| 1 | 5x | SA1 | DRY | SB | V1 | VB | SC |
| 2 | 10x | SA2 | DRY | SB | V2 | VB | SC |
| 3 | 40x | SA3 | DRY | SB | V3 | VB | SC |
| 4 | 60x | SA4 | OIL | SB | V4 | VB | SC |
| 5 | 100x | SA5 | OIL | SB | V5 | VB | SC |

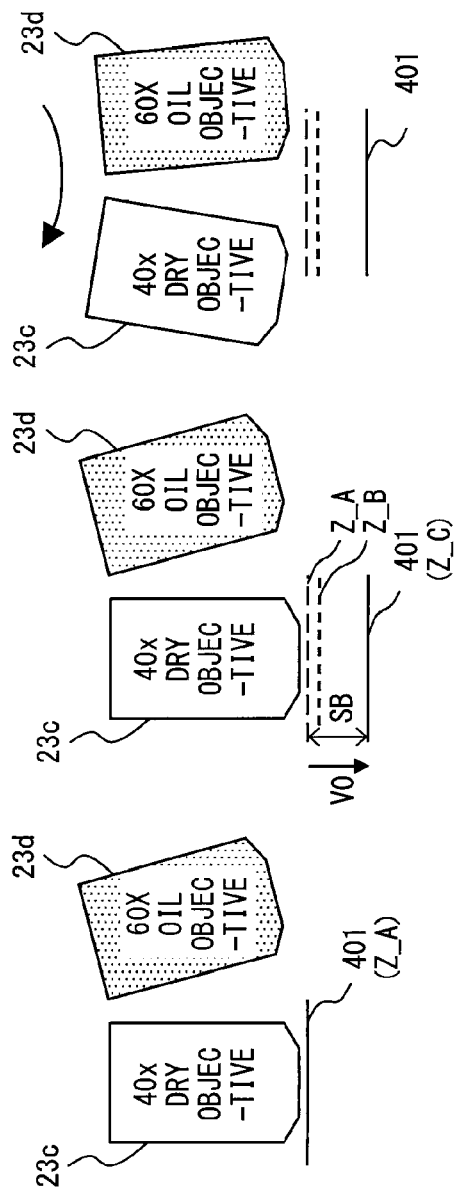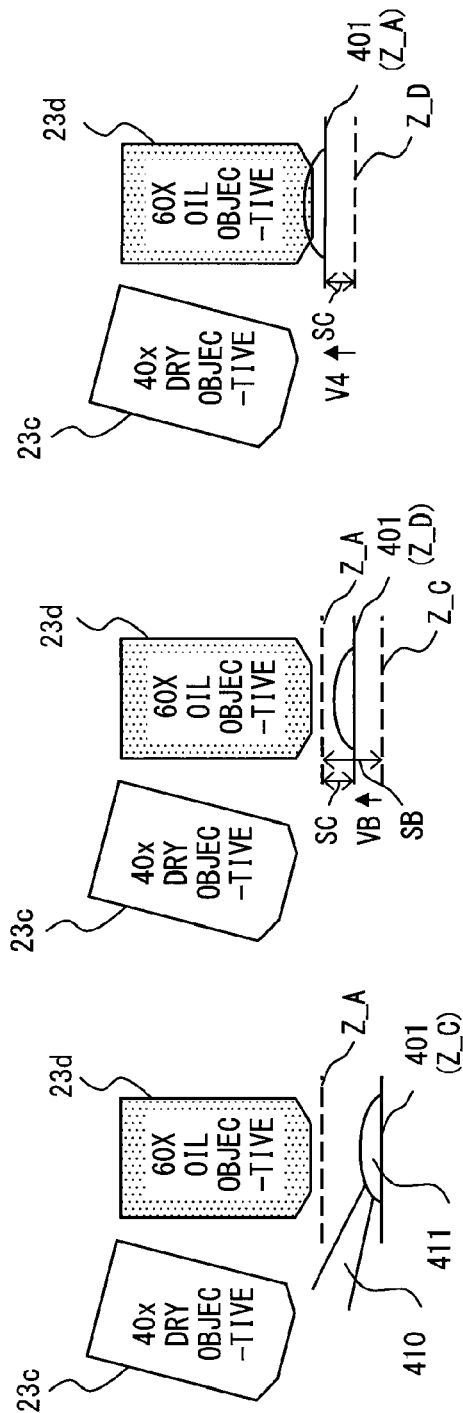
FIG. 15A  FIG. 15B  FIG. 15C
FIG. 15D  FIG. 15E  FIG. 15F

MICROSCOPE SYSTEM

CROSS-REFERENCE TO RELATED APPLICATION

This application is based upon and claims the benefit of priority of the prior Japanese Patent Application No. 2009-259311, filed on Nov. 12, 2009, the entire contents of which are incorporated herein by reference.

FIELD

The present invention relates to a microscope system having a plurality of objectives, performing a scale-up observation on a very small sample, and driving various optical members by a motor.

BACKGROUND

A microscope device is widely used in industrial fields, and various studies, inspections, etc. in a biological field. When the microscope device is used in performing an inspection, an electric stage capable of moving an observation sample on a plane orthogonal to an observation path from an objective is operated in the microscope device having a plurality of objectives of different scale-up magnifications, thereby performing observations and inspections. When samples are observed using the microscopes, it is necessary to operate various component units (for example, various types of illumination, aperture stops, field stops, revolvers, automatic focusing mechanisms, switching mechanisms of optical devices such as lenses, filters, etc.) configuring the microscopes depending on the respective observation conditions.

There are, for example, the following methods as methods for operating these component units. Commonly known is a method of connecting an operation device to a microscope body, driving each component unit depending on the drive of the operation device, and grasping the driving state of each component unit by displaying the drive on the operation device. That is, a controller dedicated for a microscope and a microscope controller such as a PC (personal computer) etc. are connected to a microscope body through a communication cable. Then, a command is communicated with the microscope body depending on the operation of the microscope controller, and various settings are made by the drive control of each component unit.

In the operation of an electric revolver, some controllers or touch panels have buttons corresponding to the objectives attached to the revolver. Any objective can be inserted directly into an optical path of the microscope by the operation of the button.

Examples of the documents of prior art technology are Japanese Patent No. 3396070, Japanese Patent 3823471, and Japanese Laid-open Patent Publication No. 2003-307684.

SUMMARY

The microscope system according to the present invention which performs an observation by a microscope for observing a sample includes: an objective switch unit provided with a plurality of objectives attached to the respective attachment holes, and capable of setting a desired objective in an optical path by switching among the plurality of objectives; a stage on which the sample is placed; a focusing mechanism for moving at least one of the stage and the objective switch unit in the direction of the optical path; an operation direction input unit for inputting a direction to operate the microscope system; a storage unit storing, for each objective, movement control information including a type flag indicating the type of an objective depending on the presence/absence of a soak or the type of the soak and a save distance for saving the stage or the objective switch unit by a predetermined distance; and a control unit acquiring from the storage unit the movement control information corresponding to the objective selected for a switch when a switch direction for the objective is input by the operation direction input unit, determining according to the type flag included in the movement control information whether or not there is a change in the type of the objective after the switch, stopping the operation after the stage or the objective switch unit is moved according to the save distance included in the movement control information when there is the change in the type of the objective after the switch, and recovering the stage or the objective switch unit to the original position after the operation direction input unit inputs an operation direction for the stage and the objective switch unit.

In the microscope system it is preferable that the movement control information further includes a first save distance used when the stage or the objective switch unit is moved according to the movement control information when there is no change in the type of the objective after the switch, and when the save distance used when the stage or the objective switch unit is moved according to the movement control information when there is a change in the type of the objective after the switch is defined as a second save distance, the second save distance is longer than any first save distances of the entire objectives.

In the microscope system, it is preferable that the movement control information further includes a moving speed when the stage or the objective switch unit is moved, and the control unit recovers the stage or the objective switch unit to the original position according to the moving speed of the movement control information when the operation direction input unit inputs an operation direction for the stage or the objective switch unit.

In the microscope system, it is preferable that the movement control information further includes a first moving speed depending on an objective when the stage or the objective switch unit is moved, a second moving speed which is a predetermined moving speed when the stage or the objective switch unit is moved and a speed faster than any first moving speeds, and a speed change distance as a predetermined distance shorter than the second save distance, and the control unit moves the stage or the objective switch unit in the direction of recovery according to the second moving speed of the movement control information until the distance between the current stage and the recovery position of the stage becomes equal to the speed change distance when the operation direction input unit inputs an operation direction for the stage or the objective switch unit, and recovers the stage or the objective switch unit to the original position according to the first moving speed of the movement control information when the distance between the stage and the objective switch unit becomes equal to the speed change distance.

In the microscope system, it is preferable that the operation direction input unit has a button corresponding to each objective attached to the objective switch unit, outputs a switch direction to an objective corresponding to any button when it is pressed, moves and then stops the stage or the objective switch unit according to the save distance included in the movement control information when there is a change in the type of the objective after the switch, and recovers the stage or the objective switch unit to the original position when the operation direction for the stage and the objective switch unit is input by pressing the button again.

BRIEF DESCRIPTION OF DRAWINGS

FIG. 3 is an example of a stage movement control information table 40 according to the first embodiment;

FIG. 4 is a top view of the microscope controller 2 according to the first embodiment;

FIGS. 8A through 8E illustrate the switching operation from a 10× dry objective 23b to a 40× dry objective 23c according to the first embodiment;

FIG. 9A through 9E illustrate the switching operation from a 40× dry objective 23b to a 60× oil objective 23d according to the first embodiment;

FIG. 10A is an example of the display screen of the touch panel when the stage is temporarily saved and stopped in the process of switching from the 40× dry objective 23b to the 60× oil objective 23d; FIG. 10B is an explanatory view of the position of the objective arranged in the electric revolver 24 in the state illustrated in FIG. 10A;

FIG. 12 illustrates a pattern for switch of an objective according to the first embodiment; FIG. 13 is an example of a stage movement control information table 40a according to the second embodiment;

FIGS. 15A through 15F illustrate the switching operation from a 40× dry objective 23c to a 60× oil objective 23d according to the first embodiment;

DESCRIPTION OF EMBODIMENTS

An objective attached to a microscope can be an immersion lens (oil objective) used by filling a liquid such as oil etc. in the space between the end of the objective and a sample, and a dry objective without using oil etc. by filling air in the space between the end of the objective and the sample.

When a sample is observed using an objective, it is necessary to inject oil etc. with a syringe etc. between the objective and the sample. In this case, if the objective is electrically switched by a conventional microscope, then an immersion lens is arranged on an optical path. In this state, the interval between the sample and the soak objective is very short, and it is difficult to inject oil. In this case, it is necessary to first switch into an oil objective, lower the stage a little, keep more room between the objective and the sample, apply a drop of oil on the sample, slowly lift the stage until the oil touches the end of the oil objective while taking care not to generate foam in the oil, and adjust the focus of the objective. Otherwise, only when a dry objective is switched to, a liquid can be injected between the objective and the sample while manually rotating the revolver.

In addition, when the switch is made from an oil objective to a dry objective, it is necessary to remove the oil between the objective and the sample. Furthermore, when the switch is made from an oil objective to a dry objective without removing the oil, there is a possibility that the oil attached to the surface of the sample may adhere to the end of the dry objective, thereby making it very hard to see an image.

However, in the conventional microscope system, the operation of the microscope when injecting and removing oil is laborious, thereby degrading the merit of the electric operation.

The present invention provides a microscope system capable of easily performing a soak injecting/removing operation and preventing the foam from being generated in the soak when there is a change in the type of objective depending on the presence/absence of a soak or the type of a soak during the insertion and replacement of the objective to and from the optical path.

<First Embodiment>

Described in the present embodiment is the microscope system capable of injecting and removing oil by temporarily saving the stage and then the stage can be recovered to the original position when the switch is made from a dry objective to an oil objective or from the oil objective to the dry objective.

Figure 1:
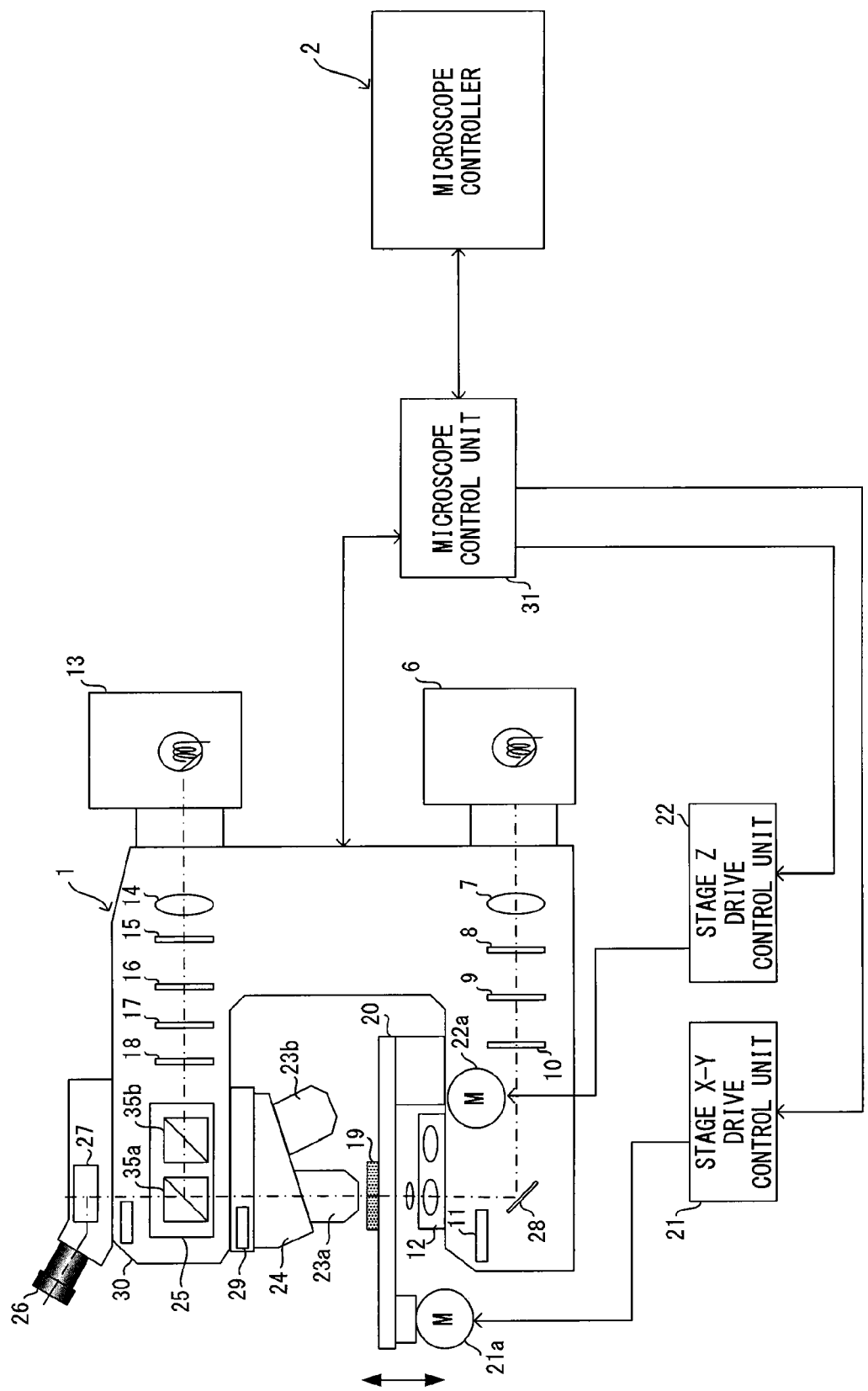
FIG. 1 is an example of the configuration of the microscope system according to the first embodiment.

FIG. 1 is an example of the configuration of the microscope system according to the present embodiment. As an optical transmission observation system, a microscope device 1 includes a transmission illumination light source 6, a collector lens 7 for collecting illumination light of the transmission illumination light source 6, a transmission filter unit 8, a transmission field stop 9, a transmission aperture stop 10, a condenser optical element unit 11, and a top lens unit 12.

As an optical epi-illumination observation system, the microscope device 1 includes an epi-illumination light source 13, a collector lens 14, an epi-light filter unit 15, an epi-light shutter 16, an epi-light field stop 17, and an epi-light aperture stop 18.

In addition, on the optical observation path where an optical path of an optical transmission observation system and an optical path of an optical epi-illumination observation system overlap each other, an electrically-operated stage 20 on which a sample 19 is placed is provided. The electrically operated stage 20 can move up and down (in the Z-axis direction) and horizontally (X- and Y-axis directions).

The movement of the electrically operated stage 20 is controlled by a stage X-Y drive control unit 21 and a stage Z drive control unit 22. The stage X-Y drive control unit 21 moves the stage 20 in the X and Y directions by controlling the drive of an X-Y motor 21a. The stage Z drive control unit 22 moves the stage 20 in the Z-axis direction by controlling the drive of a Z motor 22a.

The electrically operated stage 20 has a function (not illustrated in the attached drawings) of detecting an origin by an origin sensor. Therefore, the coordinates of the sample 19 placed on the electrically operated stage 20 can be detected and the movement of the sample 19 can be controlled by specifying the coordinates.

In addition, the revolver 24, a cube turret 25, and a beam splitter 27 are provided on the optical observation path.

The electric revolver 24 is loaded with a plurality of objectives 23a, 23b, . . . (hereinafter referred to generally as objectives 23 as necessary). By rotating the revolver 24, an objective to be used in an observation can be selected from among a plurality of objectives 23.

A fluorescence cube A (35a), a fluorescence cube B (35b), and a fluorescence cube C (not illustrated in the attached drawings) have a pumping filter, a dichroic mirror, and an absorption filter corresponding to each fluorescence observation wavelength. The cube turret 25 makes the switch among the fluorescence cube A (35a), the fluorescence cube B (35b), and the fluorescence cube C (not illustrated in the attached drawings) for arrangement on the optical path.

The beam splitter 27 branches the optical observation path to an eyepiece 26 side and a video camera (not illustrated in the attached drawings) side.

Furthermore, a polarizer 28 for a differential interference observation, a DIC (differential interference contrast) prism 29, and an analyzer 30 can be inserted into an optical observation path.

Each unit is motorized, and its operation is controlled by a microscope control unit 31.

The microscope control unit 31 is connected to the microscope controller 2. The microscope control unit 31 has the function of controlling the operation of the entire microscope device 1. The microscope control unit 31 changes a speculum method and adjusts the light of the transmission illumination light source 6 and the epi-illumination light source 13 at a control signal or a command from the microscope controller 2. Furthermore, the microscope control unit 31 has the function of transmitting the current specular state by the microscope device 1 to the microscope controller 2. In addition, the microscope control unit 31 is also connected to the stage X-Y drive control unit 21 and the stage Z drive control unit 22. Therefore, the control of the electrically operated stage 20 can be performed by the microscope controller 2 through the microscope control unit 31.

The microscope controller 2 is a controller having a touch panel 207 actually for a user inputting an operation of the microscope device 1. In a predetermined area on the touch panel 207, a predetermined attribute for operation of the microscope device 1 is set. Various operations of a microscope can be performed by a user operating the function area (a GUI (graphical user interface) button etc. displayed on the touch panel) in which predetermined attributes are set.

Figure 2:
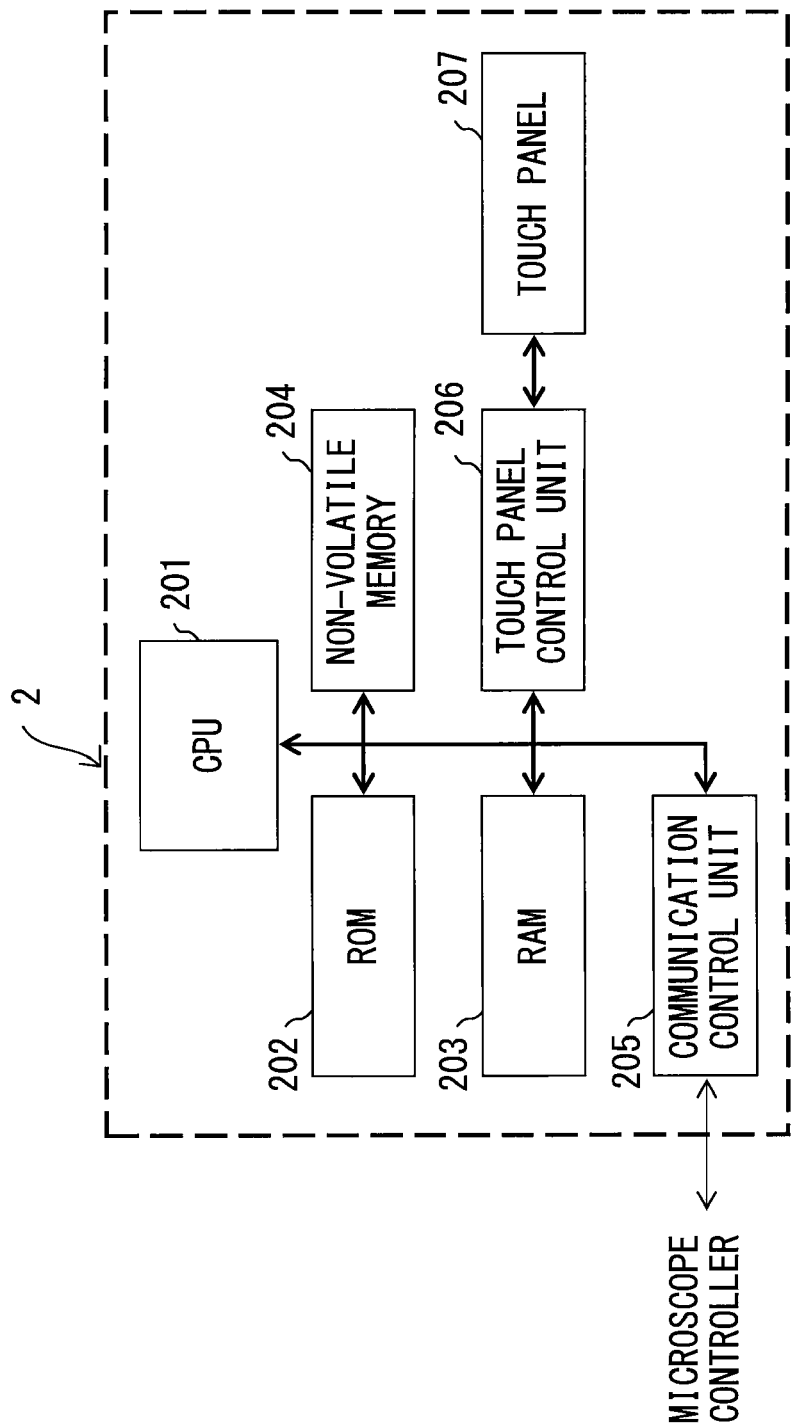
FIG. 2 illustrates the outline of the internal configuration of a microscope controller 2 according to the first embodiment.

FIG. 2 illustrates the outline of the internal configuration of the microscope controller 2 according to the present embodiment. The microscope controller 2 includes the CPU (central processing unit) 201, RAM (random access memory) 202, ROM (read only memory) 203, non-volatile memory 204, a communication control unit 205, a touch panel control unit 206, and a touch panel 207. Among these components, various data can be communicated through a bus under the control of the CPU 201.

The CPU 201 controls the operation of the entire microscope controller 2. The RAM 202 is used as a work storage area when the CPU 201 executes a control program, and temporarily stores various types of data. The ROM 203 stores in advance a control program for control of the operation of the controller 2 by the CPU 201. Application software for control of the microscope device 1 is also a part of the control program.

The non-volatile memory 204 stores in advance the information about a plurality of function areas in which predetermined attributes for operation of the microscope 1 including an operation button display (icon button display etc.) are set for display on the touch panel 207. To be concrete, the function area setting information is the information in which the coordinate information on a touch panel indicating the range of a function area is associated with the information about the function assigned to the function area for operation of a predetermined electrically operated unit configuring the microscope system. The function assigned to the function area for operation of an electrically operated unit is, for example, relating to the operation of the stage 20, a function for moving the stage 20 in the X- and Y-axis directions or the Z-axis direction, and relating to the operation of the electric revolver 24, a function of rotating an electric revolver and selecting any objective to insert it into an optical observation path. In addition, the non-volatile memory 204 stores the information illustrated in FIG. 3.

The communication control unit 205 manages the data communication (for example, serial communication) performed with the microscope control unit 31 of the body of the microscope device 1, and transmits the control information for control of the operation of each component unit to the microscope control unit 31.

The touch panel 207 has the function of a display device and the function of an input device. The touch panel 207 can be a touch panel of any type such as a film resistance system, an electrostatic capacitance system, an infrared system, an ultrasonic system, etc., and is not limited to the types. In addition, the touch panel control unit 206 detects the X coordinates and the Y coordinates of the position input by a user on the touch panel 207, and transmits the detected coordinates information to the CPU 201.

FIG. 3 is an example of the stage movement control information table 40 according to the present embodiment. The stage movement control information table 40 is stored in the non-volatile memory 204. The stage movement control information table 40 stores the information corresponding to each of the revolver hole position of the electric revolver 24.

The stage movement control information table 40 is configured by the data items of a "revolver hole position" 41, a "magnification" 42, a "first save distance" 43, a "type flag" 44, a "second save distance" 45, and a "recovery speed" 46. The "revolver hole position" 41 stores the number for identification of the revolver hole position of the electric revolver 24. The "magnification" 42 stores the magnification information about an objective. The "first save distance" 43 stores the save distance of the stage 20 in the Z-axis direction. The "type flag" 44 stores the type flag (dry or oil) for designation of a dry objective or an oil objective. The "second save distance" 45 stores the save distance (SB) of the stage 20 in the Z-axis direction for the injection and the wipe of oil. The "recovery speed" 46 stores the moving speed of the stage 20 for the recovery from the save position.

In the present embodiment, as illustrated in the stage movement control information table 40 in FIG. 3, the 5× objective 23a is inserted into the hole position of the electric revolver 24 identified by the revolver hole position=1. In the hole position of the electric revolver 24 identified by the revolver hole position=2, the 10× dry objective 23b is inserted. In the hole position of the electric revolver 24 identified by the revolver hole position=3, the 40× dry objective 23c is inserted. In the hole position of the electric revolver 24 identified by the revolver hole position=4, the 60× oil objective 23d is inserted. In the hole position of the electric revolver 24 identified by the revolver hole position=5, the 100× oil objective lens 23e is stored. Described below is the state in which the 10× dry objective 23b is inserted into the optical axis.

FIG. 4 is a top view of the microscope controller 2 according to the present embodiment. The touch panel 207 is engaged in a package 208 of the microscope controller 2. A predetermined attribute for operation of the microscope device 1 is set in a predetermined area on the touch panel 207. A user can perform the operations of various microscopes by operating the function area (a GUI (graphical user interface) button etc. displayed on the touch panel) in which a predetermined attribute is set.

The touch panel 207 is attached at the bottom of the concave portion of the package 208. A step 209a is provided between the face of the touch panel 207 and the outer surface of the package 208.

On the touch panel 207, areas (function areas) expressed by S_A, S_B, S_C, and S_D can be assigned the respective functions. Thus, when a user finger moves along the step 209a, the step 209a functions as a guide. Therefore, the positions of the function areas expressed by S_A, S_B, S_C, and S_D can be grasped along the step 209a.

Furthermore, the areas expressed by S_F, S_G, S_H, and S_I are function areas arranged at the corners of the touch panel 207. The function area S_E is arranged in the range enclosed by S_A, S_B, S_C, and S_D. In addition, one or more projections 210 and a projection frame 211 are provided on a regular frame 209.

The projection 210 has a size which can be recognized when a user moves his or her finger along the step 209a on the touch panel 207. Thus, when the user finger moves along the step 209a, the step 209a and the projection 210 function as guides. Therefore, the positions of the function areas expressed by S_A, S_B, S_C, and S_D can be more correctly grasped along the step 209a and by the positions of the projections 210.

Furthermore, by the projections 210 and the corners of the touch panel 207, the positions of the function areas expressed by S_F, S_G, S_H, and S_I enclosed by them can be more clearly grasped.

In addition, the function area S_E is separated from other function areas by the projection frame 211 provided on the touch panel 207. Thus, the projection frame 211 functions as a guide. Therefore, the position of the function area enclosed by the projection frame 211 is clearly expressed, and the position of the function area S_E can be more correctly grasped.

The CPU 201 as a control unit of the microscope controller 2 reads a program recorded on the ROM 202. Then, according to the control of the program, the CPU 201 reads the function area setting information recorded on the non-volatile memory 204, and sets the function button for operation of the microscope device 1 on the touch panel 207 according to the function area setting information.

Figure 5B:
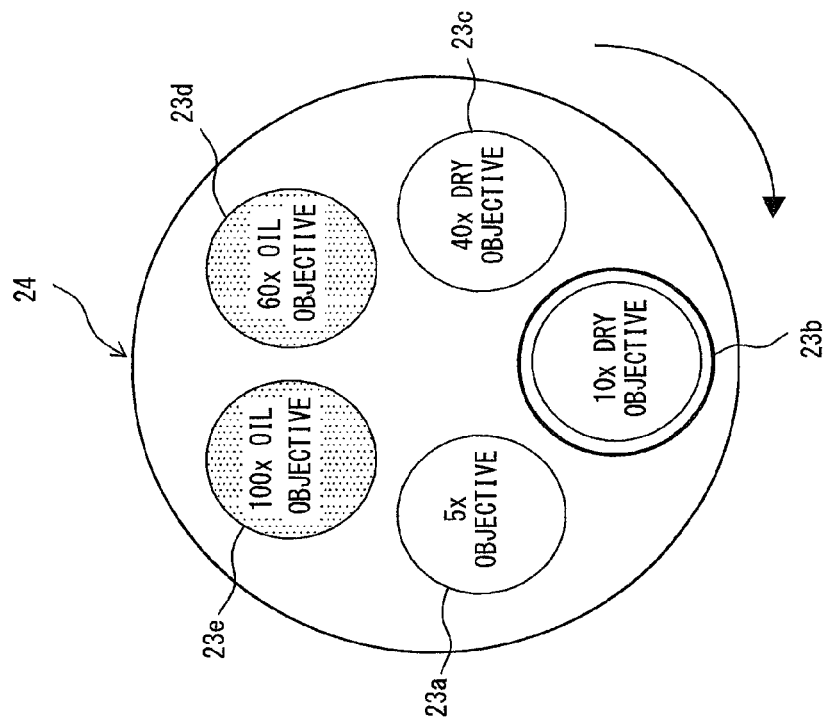
FIG. 5B is an explanatory view of the position of the objective arranged in an electric revolver 24 when the icon 302b is selected.

Described below is the switching operation of the electric revolver 24 with reference to FIGS. 5A, 5B, 6A and 6B. As illustrated in FIG. 5B, inserted into the electric revolver 24 are the 5× objective 23a, the 10× dry objective 23b, the 40× dry objective 23c, the 60× oil objective 23d, and the 100× oil objective lens 23e, and the 10× dry objective 23b is inserted into the optical axis.

Figure 5A:
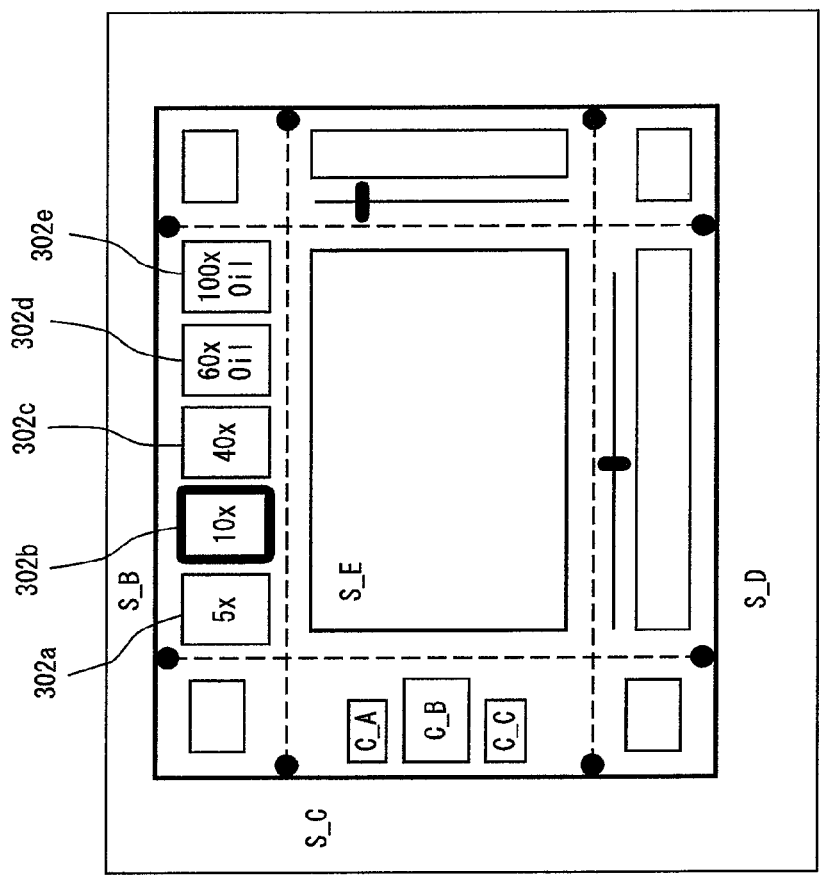
FIG. 5A illustrates the display screen of a touch panel when an icon 302b is selected for a switching operation of the objective.

As illustrated in FIG. 5A, the icons 302a through 302e indicating the objectives 23a through 23e attached to the electric revolver 24 are displayed in the area S_B. The icon of the objective inserted into the optical path is highlighted to be discriminated from the icons of other objectives outside the optical path. Since the 10× dry objective 23b is inserted into the optical path in FIG. 5A, the icon 302b is highlighted.

By the user pressing each of the icons 302a through 302e, the switch can be made directly to the objective 23 corresponding to the pressed icon. That is, when the coordinates of the pressed icon displayed on the touch panel are detected, the microscope controller 2 issues a direction to the microscope control unit 31 to perform the control of the rotation of the electric revolver 24.

For example, when the 302c is pressed in FIG. 5A, the CPU 201 of the microscope controller 2 transmits a direction signal to the microscope control unit 31. Then, the microscope control unit 31 controls the rotation of the electric revolver 24, switches from the 10× dry objective 23b to the 40× dry objective 23c, and inserts the 40× dry objective 23c into the optical path. Then, as illustrated in FIG. 6A, the icon 302c is highlighted to indicate the objective currently inserted into the optical path.

Figure 7:
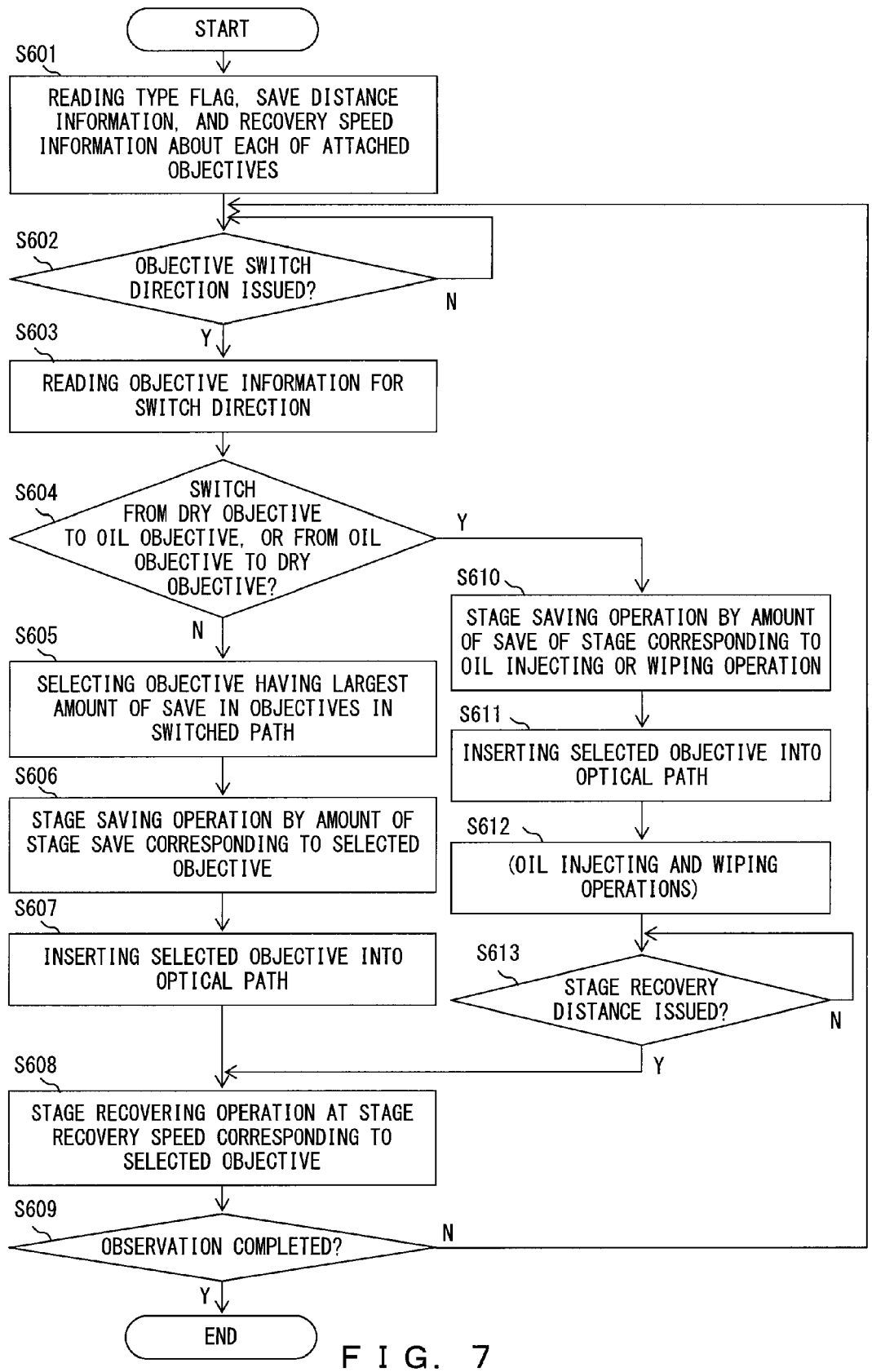
FIG. 7 is a flowchart of controlling the operation of a stage depending on the type of the objective by a CPU 201 of the microscope controller 2 when the objective is switch according to the first embodiment.

FIG. 7 is a flowchart of controlling the operation of a stage depending on the type of the objective by a CPU 201 of the microscope controller 2 when the objective is switch according to the present embodiment. FIGS. 8A through 8E illustrate the switching operation from the 10× dry objective 23b to the 40× dry objective 23c according to the present embodiment.

FIG. 8A illustrates the relationship in position between the objective and the sample 19. The solid line indicated by reference numeral 401 illustrates the position of the cover glass as the position of the top subject of the sample 19. The coordinates of the cover glass 401 of the sample 19 on the stage 20 in the current optical axis direction (Z-axis direction) are Z_A.

The CPU 201 reads the stage movement control information table 40 from the non-volatile memory 204, and expands it on the RAM 203 (S601).

In the state illustrated in FIGS. 5A and 5B, when a user presses the icon 302c (S602), the CPU 201 acquires the information about the objective directed for switch from the stage movement control information table 40 developed on the RAM 203 (S603). The CPU 201 makes a determination to which revolver hole position the switch direction refers, and a determination of a path switch (i.e., a switching path). In this example, the path switch is made from the revolver hole position=2 to the revolver hole position=3.

The CPU 201 determines whether or not there occurs a switch from a dry objective to an oil objective, or a switch from an oil objective to a dry objective during the path switch based on the "type flag" 44 of the objective included in the path switch (S604). In this example, since the switch is made from a dry objective to a dry objective ("N" in S604), the save distance having the longest save distance is determined among the "first save distance" 43 of the objectives included in the path switch (S605). In this example, the "first save distance" 43=SA3 of the revolver hole position=3 is selected.

The CPU 201 transmits a direction signal to the stage Z drive control unit 22 through the microscope control unit 31. According to the direction signal, the stage Z drive control unit 22 saves the stage 20 by the first save distance SA3 as illustrated in FIG. 8B (S606). The save speed of the stage 20 is determined by the predetermined value V0.

The Z coordinate of the cover glass 401 of the sample 19 after saving the stage 20 is Z_B. When the save of the stage 20 is completed, the CPU 201 transmits a direction signal to the electric revolver 24 through the microscope control unit 31. At the direction signal, the electric revolver 24 inserts a 40× dry objective attached at the revolver hole position=3 into the optical axis (S607).

As illustrated in FIG. 8D, after a 40× dry objective is inserted into the optical observation path, the CPU 201 performs again the control to recover the stage 20 by the first save distance SA3 as illustrated in FIG. 8E. In this case, the stage 20 is recovered at the "recovery speed" 46=V3 corresponding to the revolver hole position=3 (S608).

After the recovery of the stage 20, the Z coordinate of the cover glass 401 of the sample 19 is recovered to the coordinate of Z_A again as illustrated in FIG. 8E. In this case, as illustrated in FIG. 6A, the icon 302b enters a normal display state, and the icon 302c is highlighted.

Next, with reference to FIGS. 9A through 9E, the switching operation from the 40× dry objective 23c to the 60× oil objective 23d is described below.

FIG. 9A illustrates the relationship in position between the objective and the sample 19 as in FIG. 8A. The solid line indicated by the reference numeral 401 indicates the position of the cover glass as the position of the top surface of the sample 19. The coordinate of the cover glass 401 of the sample 19 on the stage 20 in the current optical axis direction (Z-axis direction) is Z_A.

Figure 6B:
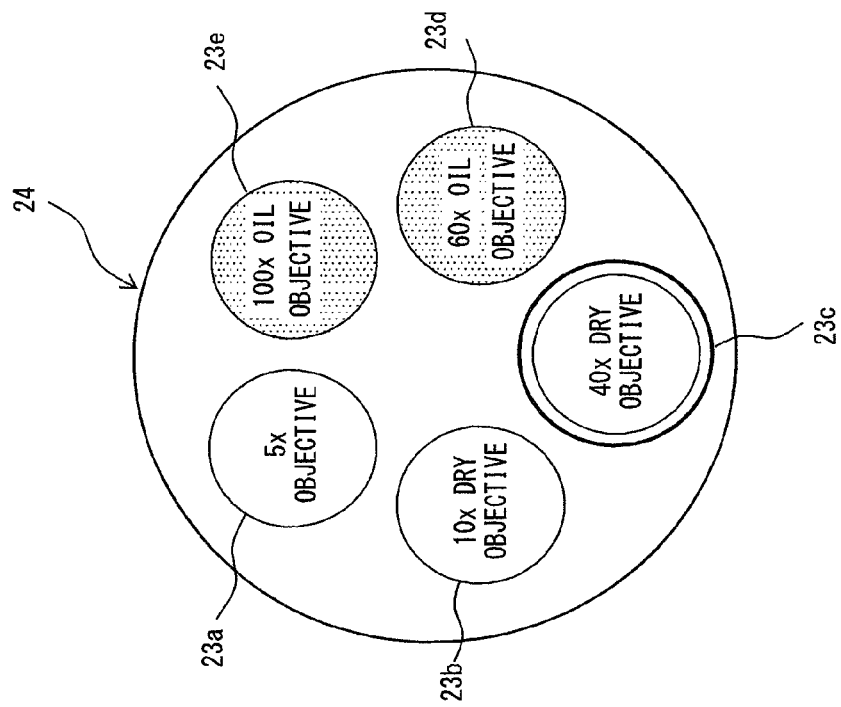
FIG. 6B is an explanatory view of the position of the objective arranged in an electric revolver 24 when the icon 302c is selected.
Figure 6A:
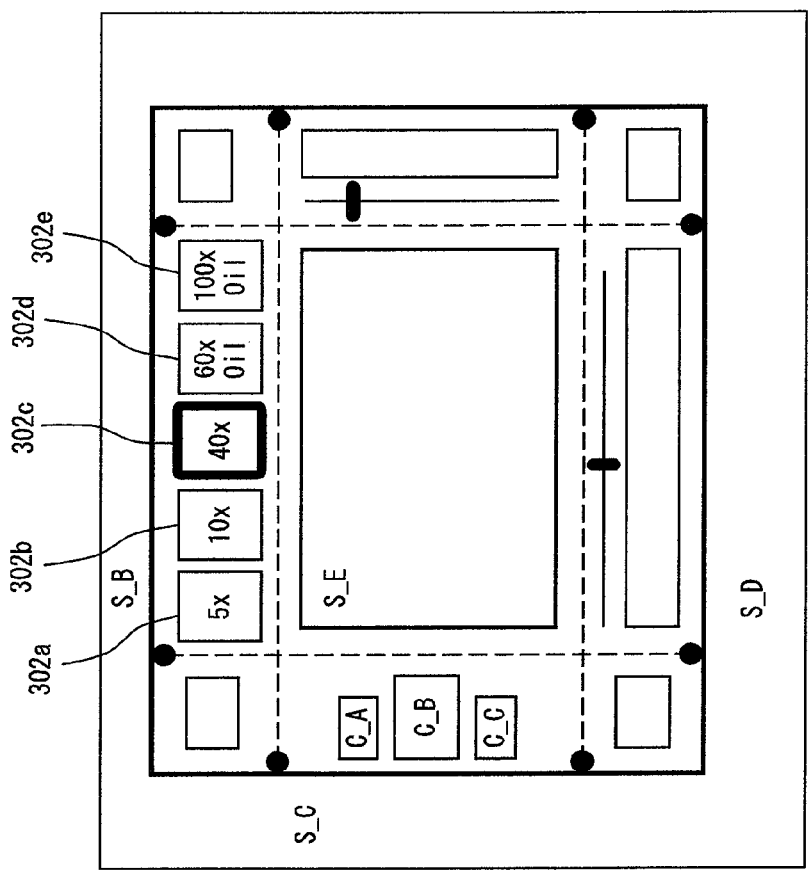
FIG. 6A illustrates the display screen of a touch panel when an icon 302c is selected for a switching operation of the objective.

In the state illustrated in FIGS. 6A and 6B, when a user presses the icon 302d (S602), the CPU 201 acquires the information about the objective directed for switch from the stage movement control information table 40 developed on the RAM 203 (S603). The CPU 201 makes a determination to which revolver hole position the switch direction refers, and a determination of a path switch. In this example, the path switch is made from the revolver hole position=3 to the revolver hole position=4.

The CPU 201 determines whether or not there occurs a switch from a dry objective to an oil objective, or a switch from an oil objective to a dry objective during the path switch based on the "type flag" 44 of the objective included in the path switch (S604). In this example, since the switch is made from a dry objective to an oil objective ("Y" in S604), the "second save distance" 45=SB corresponding to the oil injecting/wiping operation is selected as a stage save distance.

The CPU 201 transmits a direction signal to the stage Z drive control unit 22 through the microscope control unit 31. According to the direction signal, the stage Z drive control unit 22 saves the stage 20 at the speed V0 by the second save distance SB as illustrated in FIG. 9B (S610).

The Z coordinate of the sample 19 after the save is Z_C. When the save of the stage 20 is completed, the CPU 201 transmits a direction signal to the electric revolver 24 through the microscope control unit 31. At the direction signal, the electric revolver 24 inserts the 60× oil objective attached at the revolver hole position=4 into the optical path as illustrated in FIG. 9C (S611). After the 60× oil objective is inserted into the optical path, the recovering position of the stage 20 is not performed, and the stage 20 enters the stopped state.

In this case, the icon 302d enters the blinking state as illustrated in FIG. 10A. As illustrated in FIG. 9D, the user performs the injecting operation etc. of oil 411 using a syringe 410 (S612). After the operation, when the user presses again the icon 302d (S613), the CPU 201 recovers the stage 20 by a second save distance SB as illustrated in FIG. 9E. In this case, the stage 20 is recovered at the "recovery speed" 46=V4 corresponding to the 60× oil objective of the revolver hole position=4 (S608).

Figure 11B:
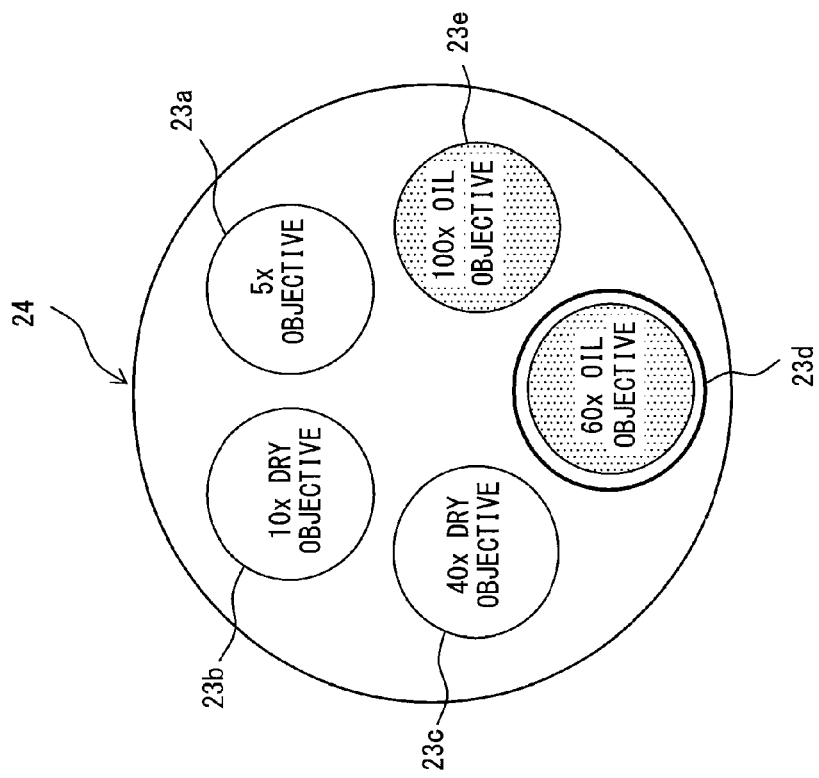
FIG. 11B is an explanatory view of the position of the objective arranged in an electric revolver 24 when the icon 302d is selected.
Figure 11A:
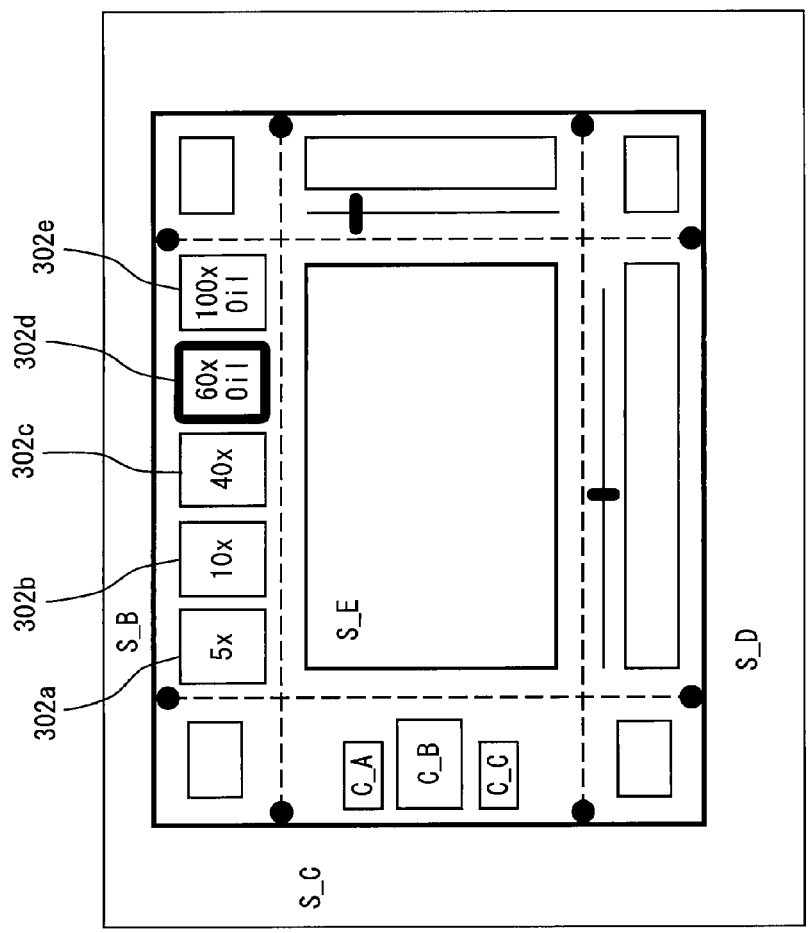
FIG. 11A illustrates the display screen of a touch panel when an icon 302d is selected for a switching operation of the objective.

After the recovery of the stage 20, the Z coordinate of the cover glass 401 of the sample 19 is recovered to the coordinate of Z_A again as illustrated in FIG. 9E. In this case, as illustrated in FIG. 11A, the icon 302c enters a normal display state, and the icon 302d is highlighted.

FIG. 12 illustrates a pattern for switch of an objective according to the first embodiment. The switch from a dry objective to a dry objective indicated by the pattern 1 is illustrated in FIGS. 8A through 8E. The switch from a dry objective to an oil objective indicated by the pattern 2 is illustrated in FIGS. 9A through 9E.

The switch from an oil objective to a dry objective (pattern 3) and the switch from an oil objective to an oil objective (pattern 4) can also be performed according to the flowcharts in FIG. 7. In the case of the pattern 3, as in the pattern 2, the stage 20 is temporarily stopped in the saved state during the switch, and is recovered after the operation of wiping the oil. In the case of the pattern 4, as in the pattern 1, the stage 20 is recovered after it is saved during the switch.

As described above, the microscope system according to the present embodiment has a first save distance (SA1-SA5) as the information about each objective corresponding to the revolver hole position, a type flag of a dry objective or an oil objective (dry/oil), a second save distance (SB) for injecting or wiping oil, and a recovery speed (V1-V5) for recovery. Thus, when the switch from a dry objective to an oil objective or from an oil objective to a dry objective is performed, the operation of injecting and wiping the oil can be easily performed. Simultaneously, since the recovery speed of a stage can be set depending on the type of an objective, the generation of foam can be prevented. In addition, since the recovery speed of a stage can be set for each objective, the recovery speed of a stage can be set depending on the oil objective, thereby preventing foam from being generated.

<Second Embodiment>

Described below according to the present embodiment us the microscope system capable of changing the recovery speed depending on the recovery distance when a stage is recovered again after it is temporarily saved and the oil injecting and wiping operations are performed according to the first embodiment. The configuration of the system according to the present embodiment is the same as that according to the first embodiment. In the present embodiment, the same configuration as in the first embodiment is assigned the same reference numeral, and the detailed description is omitted here.

FIG. 13 is an example of a stage movement control information table 40a according to the present embodiment. The stage movement control information table 40a is stored in the non-volatile memory 204. The stage movement control information table 40a is obtained by adding the data items of a "second recovery speed" 47 and a "speed change distance" 48 to the stage movement control information table 40 in FIG. 3. In FIG. 3, the data item expressed by the "recovery speed" 46 is expressed by the "first recovery speed" 46 in FIG. 13.

The "second recovery speed" 47 stores the recovery speed (VB) faster than the recovery speed stored in the "first recovery speed" 46. The "speed change distance" 48 stores the speed change distance (SC) as the condition of switching from the second recovery speed to the first recovery speed depending on the objective when the recovery is performed.

Described below is the switching operation from the 40× dry objective 23c to the 60× oil objective 23d.

Figure 14:
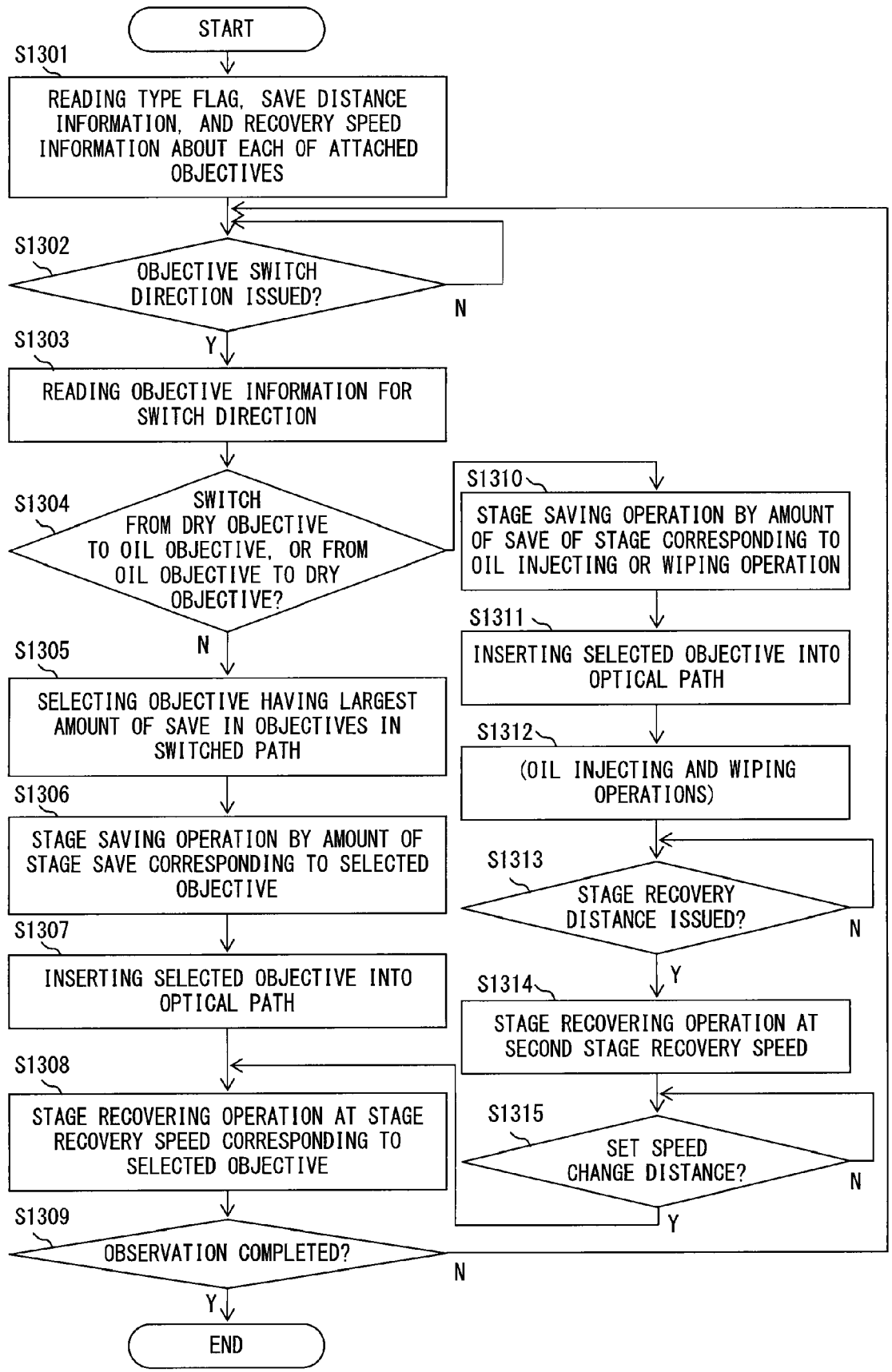
FIG. 14 is a flowchart of controlling the operation of a stage depending on the type of the objective by the CPU 201 of the microscope controller 2 when the objective is switched according to the second embodiment.

FIG. 14 is a flowchart of controlling the operation of a stage depending on the type of the objective by the CPU 201 of the microscope controller 2 when the objective is switch according to the present embodiment. FIGS. 15A through 15F illustrate the switching operation from the 40× dry objective 23c to the 60× oil objective 23d according to the present embodiment.

FIG. 15A illustrates the relationship in position between the objective and the sample 19. The solid line indicated by the reference numeral 401 indicates the position of the cover glass as the position of the top surface of the sample 19. The coordinate of the sample 19 on the stage 20 in the current optical axis direction (Z-axis direction) is Z_A.

The CPU 201 reads the stage movement control information table 40a from the non-volatile memory 204, and develops it on the RAM 203 (S1301).

In the state illustrated in FIGS. 6A and 6B, when a user presses the icon 302d (S1302), the CPU 201 acquires the information about the objective directed for switch from the stage movement control information table 40a developed on the RAM 203 (S1303). The CPU 201 makes a determination to which revolver hole position the switch direction refers, and a determination of a path switch. In this example, the path switch is made from the revolver hole position=2 to the revolver hole position=3.

The CPU 201 determines whether or not there occurs a switch from a dry objective to an oil objective, or a switch from an oil objective to a dry objective during the path switch based on the "type flag" 44 of the objective included in the path switch (S1304). In this example, since the switch is made from a dry objective to an oil objective ("Y" in S1304), the "second save distance" 45=SB corresponding to the oil injecting/wiping operation is selected as a stage save distance.

The CPU 201 transmits a direction signal to the stage Z drive control unit 22 through the microscope control unit 31. According to the direction signal, the stage Z drive control unit 22 saves the stage 20 at the speed V0 by the second save distance SB as illustrated in FIG. 15B (S1310).

The Z coordinate of the cover glass 401 covering the sample 19 after the save is Z_C. When the save of the stage 20 is completed, the CPU 201 transmits a direction signal to the electric revolver 24 through the microscope control unit 31. At the direction signal, the electric revolver 24 inserts the 60× oil objective attached at the revolver hole position=4 into the optical path as illustrated in FIG. 15C (S1311). After the 60× oil objective is inserted into the optical path, the recovering position of the stage 20 is not performed, and the stage 20 enters the stopped state.

In this case, the icon 302d enters the blinking state as illustrated in FIG. 10A. As illustrated in FIG. 15D, the user performs the injecting operation etc. of oil 411 using a syringe 410 (S1312). After the operation, when the user presses again the icon 302d (S1313), the CPU 201 recovers the stage 20 by a second save distance SB as illustrated in FIG. 15E (S1314). In this case, the stage 20 is recovered at the speed VB stored in the "second recovery speed" 47.

In this case, the distance between the current position and the recovery position of the stage 20 reaches the distance SC stored in the "speed change distance" 48 (S1315), the "second recovery speed" 47=VB is changed into the speed of the "first recovery speed" 46=V4 corresponding to the 60× oil objective of the revolver hole position=4 (S1308). The Z coordinate of the cover glass 401 covering the sample 19 when the speed change is made is Z_D.

After the recovery of the stage 20, the coordinate of the cover glass covering the sample 19 is recovered to the coordinates of Z_A as illustrated in FIG. 15F. In this case, as illustrated in FIG. 11A, the icon 302c is in the normal display state, and the icon 302d is highlighted.

As described above, the microscope system according to the present embodiment is provided with the second recovery speed (VB) and the speed change distance (SC) in addition to the components according to the first embodiment. Thus, the recovery time of the stage 20 can be shortened, and the generation of foam can be prevented.

The embodiments of the present invention have been described above, but the present invention is not limited to these embodiments, and various improvements and amendments can be made within the scope of the gist of the present invention. For example, according to the present embodiment, an input direction to change from the stage save state to the recovery state is issued by twice pressing a button 302 on the touch panel 207 of the microscope controller 2, but a dedicated button can be additionally provided.

In addition, in the above-mentioned embodiment, the electric revolver 24 is switched by pressing an icon corresponding to each objective, but it also can be switched at a switch direction by the rotation direction.

Furthermore, the input button is provided on the touch panel, but it also can be a button such as a hand switch etc. Additionally, although a microscope controller having a touch panel is described according to the present embodiment, the touch panel can be replaced with a device having a function equivalent to the touch panel.

Although the stage 20 is moved in the optical axis direction with respect to the electric revolver according to the present embodiment, the electric revolver can be moved in the optical axis direction with respect to the stage 20. In addition, although oil (immersion oil) and an oil objective are used as a soak system according to the present embodiment, the present invention is not limited to this application. That is, for example, water and water immersion objective can be used as the soak system.

In the microscope system according to each embodiment, an upright microscope device is used as the microscope device 1, but it is obvious that the device can be replaced with an inverted microscope device. In addition, the present embodiment can be applied to each system such as a line device in which a microscope device is incorporated.

The microscope system according to the embodiments of the present invention is provided with first save distance information corresponding to the revolver hole position, a type flag of a dry objective or an oil objective, second save distance for injection or wipe of oil, and a recovery speed for recovery. Thus, during the switch from a dry objective to an oil objective, or the switch from an oil objective to a dry objective, the recovering operation in a stage save recovery can be automatically stopped temporarily. Therefore, the oil injecting and wiping operations can be easily performed, thereby reducing the load of the user.

In addition, since the stage recovery speed can be set for each objective, the stage recovery speed depending on the oil objective can be set. Therefore, the generation of oil can be prevented.

The microscope system which performs an observation by a microscope for observing a sample according to the present embodiment includes an objective switch unit, a stage, a focusing mechanism, an operation direction input unit, a storage unit, and a control unit.

The objective switch unit is loaded with a plurality of objectives at the respective attachment holes, and switches any one of the plurality of objectives, thereby setting a desired objective in the optical path. The objective switch unit corresponds to, for example in the present embodiment, the electric revolver 24. The stage is loaded with the sample. The stage corresponds to, for example in the present embodiment, the stage 20.

The focusing mechanism moves at least one of the stage and objective switch unit in the optical path direction. The focusing unit corresponds to, for example in the present embodiment, the stage Z drive control unit 22.

The operation direction input unit inputs a direction to operate the microscope system. The operation direction input unit corresponds to, for example in the present embodiment, the touch panel 207 according to the present embodiment.

The storage unit stores for each objective the movement control information including a type flag indicating the type of the objective depending on the presence/absence of a soak or the type of a soak, and the movement control information including a save distance for saving the stage or the objective switch unit by a predetermined distance. The storage unit corresponds to, for example in the present embodiment, the non-volatile memory 204. The movement control information corresponds to, for example in the present embodiment, the stage movement control information tables 40 and 40a.

The control unit acquires from the storage unit the movement control information corresponding to the objective directed for switch when a switch direction for the objective is input from the operation direction input unit. The control unit determines according to the type flag included in the movement control information whether or not the type of the objective has changed after the switch. The control unit stops the operation after the stage or the objective switch unit is moved by the save distance included in the movement control information when the type of the objective has changed. Then the control unit recovers the stage or the objective switch unit to the original position after the operation direction about the stage and the objective switch unit is input by the operation direction input unit. The control unit corresponds to, for example in the present embodiment, the CPU 201.

With the configuration above, the stage is temporarily saved, oil is injected or wiped when the type of the objective has changed depending on the presence/absence of a soak or the type of the soak during the insertion or the replacement of the objective to or from the microscope optical path, and then the stage can be recovered again. Therefore, the operation of injecting or removing a soak can be easily performed, and the generation of foam in the soak can be prevented.

In addition, the movement control information further includes a first save distance used when the stage or the objective switch unit is moved according to the movement control information when the type of the objective does not change after the switch. If it is assumed that the save distance used when the stage or the objective switch unit is moved according to the movement control information when the type of the objective changes after the switch is defined as a second save distance, then the second save distance is longer than any first save distance of the entire objective.

With the configuration above, when the switch from a dry objective to an oil objective or the switch from an oil objective to a dry objective is made, the oil injecting or wiping operation can be easily performed.

The movement control information further includes a moving speed when the stage or the objective switch unit is moved. The control unit recovers the stage or the objective switch unit to the original position at the moving speed of the movement control information when the operation direction input unit inputs an operation direction about the stage or the objective switch unit.

With the configuration above, the stage recovery speed can be set depending on the oil objective, thereby preventing the generation of foam. In addition, since the stage recovery speed can be set for each objective, thereby preventing the generation of foam.

The movement control information further includes the first moving speed depending on the objective when the stage or the objective switch unit is moved, the second moving speed which is a predetermined moving speed when the stage or the objective switch unit is moved and faster than any of the first moving speeds, and the speed change distance which is a predetermined distance shorter than the second save distance. When the operation direction input unit input the operation direction about the stage or the objective switch unit, the control unit moves the stage or the objective switch unit in the direction of the recovery of the stage or the objective switch unit based on the second moving speed of the movement control information until the distance between the current stage and the recovery position of the stage reaches the speed change distance, and when the distance between the stage and the objective switch unit reaches the speed change distance, it recovers the stage or the objective switch unit to the original position according to the first moving speed of the movement control information.

With the configuration above, the recovery time of the stage can be shortened, and the generation of foam can be prevented.

In addition, the operation direction input unit has buttons corresponding to the respective objectives attached to the objective switch unit. In this case, by pressing any button, a switch direction to the objective corresponding to the button is output. Then, when there is a change in type of the objective after the switch, the operation is stopped after the stage or the objective switch unit is moved by the save distance included in the movement control information, and when an operation direction is input about the stage and the objective switch unit by pressing the button again, the stage or the objective switch unit is recovered to the original position. The buttons correspond to, for example in the present embodiment, the icons 302a through 302e.

With the configuration above, for example, the stage is temporarily saved and oil is injected or wiped, and by pressing the button corresponding to the objective to be switched to, the stage can be recovered.

According to the present invention, if the type of an objective is changed depending on the presence/absence of a soak or the type of the soak when an objective is inserted or replaced to and from the microscope optical path, then the operations of injecting and removing the soak can be easily performed, and the generation of foam in the soak can be prevented.

What is claimed is:

1. A microscope system which performs an observation of a sample by a microscope, comprising:
   an electrically-operated objective switch unit which is provided with a plurality of objectives attached to respective attachment holes, and which is capable of setting a desired objective in an optical path by switching among the plurality of objectives;
   a stage on which the sample is placeable;
   an electrically-operated focusing mechanism which moves at least one of the stage and the objective switch unit in a direction of the optical path;
   an operation direction input unit which includes a first plurality of Graphical User Interface (GUI) buttons and which comprises a touch panel that can change a display of the first plurality of GUI buttons, wherein the operation direction input unit inputs a direction to operate the microscope system; and
   a storage unit which stores, for each of the plurality of objectives, movement control information including a type flag indicating a type of the objective depending on presence/absence of a soak or a type of the soak and a save distance for moving the stage or the objective switch unit by a predetermined distance;
   wherein the first plurality of GUI buttons include a second plurality of GUI buttons respectively corresponding to the plurality of objectives attached to the objective switch unit, wherein the second plurality of GUI buttons are arranged in the operation direction input unit, and
   wherein when one of the plurality of second buttons is pressed down, the microscope system: (i) outputs an objective switch direction to switch to one of the plurality of objectives that corresponds to said pressed one of the plurality of second buttons, (ii) performs discrimination of a switching path for switching to said one of the plurality of objectives selected for the switch, (iii) acquires from the storage unit the movement control information corresponding to each objective included in the switching path, (iv) determines according to the type flag included in the acquired movement control information whether or not the type of the objective before the switch is different from the type of any other objective included in the switching path, (v) moves the stage or the objective switch unit according to the save distance included in the acquired movement control information when the type of any other objective included in the switching path is different from the type of the objective before the switch, and (vi) when the type of the objective before the switch is different from the type of said one of the plurality of objectives selected for the switch, the microscope system: (A) stops an operation after the stage or the objective switch unit is moved according to the save distance, (B) causes said pressed one of the plurality of second buttons to display information indicating that the stage or the objective switch unit is in a stopped state by changing a display state of said pressed one of the plurality of second buttons, and (C) recovers the stage or the objective switch unit to an original position by moving the stage or the objective switch unit in the direction of the optical path when an operation direction for the stage and the objective switch unit is input by pressing said one of the plurality of second buttons again.

2. A microscope system which performs an observation of a sample by a microscope, comprising:

an objective switch unit which is provided with a plurality of objectives attached to respective attachment holes, and which is capable of setting a desired objective in an optical path by switching among the plurality of objectives;

a stage on which the sample is placeable;

a focusing mechanism which moves at least one of the stage and the objective switch unit in a direction of the optical path;

an operation direction input unit which inputs a direction to operate the microscope system;

a storage unit which stores, for each of the plurality of objectives, movement control information including a type flag indicating a type of the objective depending on presence/absence of a soak or a type of the soak and a save distance for moving the stage or the objective switch unit by a predetermined distance; and a control unit which, when a switch direction to switch to one of the plurality of objectives is input by the operation direction input unit: (i) performs discrimination of a switching path for switching to said one of the plurality of objectives selected for the switch, (ii) acquires from the storage unit the movement control information corresponding to each objective included in the switching path, (iii) determines according to the type flag included in the acquired movement control information whether or not the type of the objective before the switch is different from the type of any other objective included in the switching path, (iv) moves the stage or the objective switch unit according to the save distance included in the acquired movement control information when the type of any other objective included in the switching path is different from the type of the objective before the switch, and (v) when the type of the objective before the switch is different from the type of said one of the plurality of objectives selected for the switch, the control unit: (A) stops an operation after the stage or the objective switch unit is moved according to the save distance, and (B) recovers the stage or the objective switch unit to an original position by moving the stage or the objective switch unit in the direction of the optical path after the operation direction input unit inputs an operation direction for the stage and the objective switch unit, wherein the operation direction input unit includes an operation direction input display unit which displays information of said one of the plurality of objectives, and wherein the control unit causes the operation direction input display unit to display information indicating that the stage or the objective switch unit is in a stopped state after the stage or the objective switch unit moves in the direction of the optical path and stops.

3. The microscope system according to claim 2, wherein the operation direction input unit: (i) comprises a plurality of buttons respectively corresponding to the plurality of objectives attached to the objective switch unit, (ii) outputs the switch direction for said one of the plurality of objectives when a corresponding one of the plurality of buttons is pressed, (iii) moves and then stops the stage or the objective switch unit in the direction of the optical path according to the save distance included in the acquired movement control information when there is a change in the type of the objective after the switch, and (iv) recovers the stage or the objective switch unit to the original position by moving the stage or the objective switch unit in the direction of the optical path when the operation direction for the stage and the objective switch unit is input by pressing the corresponding one of the plurality of buttons again.

4. The microscope system according to claim 3, wherein:

the movement control information further includes a first save distance which is used when the stage or the objective switch unit is moved according to the acquired movement control information when there is no change in the type of the objective after the switch;

the save distance used when the stage or the objective switch unit is moved according to the acquired movement control information when there is a change in the type of the objective after the switch is a second save distance; and the second save distance is longer than the first save distance of each of the plurality of objectives.

5. The microscope system according to claim 3, wherein:

the movement control information further includes a moving speed with which the stage or the objective switch unit is moved in the direction of the optical path; and the control unit recovers the stage or the objective switch unit to the original position according to the moving speed of the acquired movement control information in the direction of the optical path when the operation direction input unit inputs the operation direction for the stage and the objective switch unit.

6. The microscope system according to claim 3, wherein:

the movement control information further includes a first moving speed with which the stage or the objective switch unit is moved, a second moving speed which is a predetermined moving speed with which the stage or the objective switch unit is moved, wherein the second moving speed is faster than the first moving speed of each of the plurality of objectives, and a speed change distance as a predetermined distance shorter than the save distance; and the control unit moves the stage or the objective switch unit in a direction of recovery along the optical path according to the second moving speed of the acquired movement control information until a separation distance between the stage and the objective switch unit becomes equal to the speed change distance of the acquired movement control information, when the operation direction input unit inputs the operation direction for the stage and the objective switch unit, and the control unit recovers the stage or the objective switch unit to the original position according to the first moving speed of the acquired movement control information when the separation distance between the stage and the objective switch unit becomes equal to the speed change distance.

7. The microscope system according to claim 3, wherein the operation direction input unit comprises a touch panel in which a plurality of Graphical User Interface (GUI) buttons are arranged.

8. The microscope system according to claim 2, wherein the switching path includes three or more of the plurality of objectives.

* * * * *